United States Patent Office  3,849,420
Patented Nov. 19, 1974

3,849,420
BIS-(ALKYLTHIO- AND ALKYLSULFONYL)-
PENTACHLOROQUINOLINES
Yulan C. Tong, Walnut Creek, Calif., assignor to The
Dow Chemical Company, Midland, Mich.
No Drawing. Filed Oct. 20, 1972, Ser. No. 299,420
Int. Cl. C07d 33/60
U.S. Cl. 260—283 S                                19 Claims

ABSTRACT OF THE DISCLOSURE

Disclosed are novel bis(alkylthio- and alkylsufonyl) pentachloroquinoline compounds, said bis-(alkylthio) pentachloroquinoline compounds being useful as intermediates in the preparation of the corresponding bis-(alkylsulfonyl)pentachloroquinoline compounds which are suitable for use as fungicides.

SUMMARY OF THE INVENTION

There is provided according to the present invention compounds of the formula:

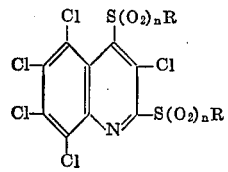

wherein $n$ is 0 or 1; and
each R represents alkyl of from 1 to 10 carbon atoms. phenyl, or cycloalkyl of 5 to 8 carbon atoms.

Compounds wherein $n$ is 0 or intermediates for the preparation of compounds wherein $n$ is 1 which are useful as fungicides.

DETAILED DESCRIPTION OF THE INVENTION

The term "alkyl" as used herein means both straight and branched chain alkyl radicals containing from 1 to 10 carbon atoms, e.g., methyl, ethyl, propyl, isopropyl, butyl, isobutyl, amyl, hexyl, 2-ethyl hexyl, heptyl, octyl, decyl and the like. The term "cycloalkyl" as used herein means, cyclopentyl, cyclohexyl, cyclooctyl and the like.

The compounds of the present invention wherein $n$ is 0 are prepared by reacting heptachloroquinoline with an alkali metal mercaptan salt (R—S— alkali metal wherein R is as previously defined and the alkali metal is sodium or potassium) in the presence of an inert liquid reaction medium such as, for example, ethanol, methanol, isopropanol, dimethylsulfoxide or the like. The reaction proceeds readily under ambient atmospheric pressure at temperatures of from about 15 to about 25° C., preferably at about room temperature, i.e., ordinarily about 20° C.

The alkali metal mercaptan reactant is conveniently prepared in situ by adding a mercaptan (RSH) to a mixture of a stiochiometric amount of an alkali metal or alkali metal hydroxide in a suitable reaction medium, such as previously described, thereby to form the corresponding alkali metal mercaptan.

The heptachloroquinoline and the alkali metal mercaptan are intimately contacted in one of the inert reaction mediums listed above to prepare the bis-(alkylthio)pentachloroquinoline compounds of the present invention. A ratio of 2 moles of alkali metal mercaptan per mole of heptachloroquinoline is preferably employed. In contacting the reactants, the heptachloroquinoline reactant is usually dispersed in a suitable reaction medium and the alkali metal mercaptan solution added dropwise thereto while agitating the resulting mixture. The reaction mixture is usually cooled during the addition of the alkali metal mercaptan to maintain the reaction temperature at about 20° C.

Following the completion of the alkali metal mercaptan addition, the reaction mixture is usually maintained at ambient temperatures with agitation for a period of from about 1 to about 20 hours in order to substantially complete the reaction. After the reaction period, the reaction mixture is filtered and the solid precipitate obtained is dried. The dried material is dissolved in a suitable solvent such as chloroform, dichloromethane or the like and the resulting solution concentrated by evaporation to obtain a residue representing the desired product. The resulting product may be purified, if desired, by conventional methods such as recrystallization or the like.

The bis-(alkylsulfonyl)pentachloroquinoline compounds of the present invention are prepared by reacting the corresponding bis(alkylthio)pentachloroquinoline compound with an oxidizing agent. The oxidation of the bis-(alkylthio)pentachloroquinoline compounds directly to the corresponding bis-(alkylsulfonyl)pentachloroquinoline compounds consumes two atoms of oxygen for each sulfur atom in each molecule of bis-(alkylthio)pentachloroquinoline compound so oxidized. In carrying out the oxidation reaction, it is preferable to employe oxidizing agents in minor quantities which will provide, at a maximum, oxygen in the stoichiometric quantities consumed in the conversion to the sulfonyl compounds (i.e., those compounds where $n$ is 1). In some instances, the use of a slight excess of the oxidizing agent is preferred. However, the use of the reactants in any particular proportions is not critical, some of the desired product being formed upon combining the reactants in any proportions.

Representative oxidizing agents for the preparation of the sulfonyl compounds include fuming nitric acid, nitric acid, hydrogen peroxide, potassium permanganate and chromate-sulfuric acid (mixture of alkali metal chromate and sulfuric acid).

Hydrogen peroxide, and conveniently an aqueous solution thereof, can be employed as the oxidizing agent in the production of the sulfonyl derivatives of the present invention. In such embodiment, the reaction is carried out in the presence of a liquid reaction media such as glacial acetic acid or a mixture of acetic acid and acetic anhydride. In a preferred procedure, the acid-anhydride mixture is employed as the liquid reaction medium. The oxidation reaction takes place readily at temperatures of from about 40 to about 60° C. Preferably, a reaction temperature of from about 45 to 55° C. is maintained. In carrying out the reaction, the oxidation mixture is usually added portionwise to the bis-(alkylthio)pentachloroquinoline reactant in a liquid media as described. The addition is controlled so as to maintain the reaction mixture within the indicated reaction temperature range. Following the completion of the oxidation mixture addition, the reaction mixture is maintained within the reaction temperature range for a short period of time, usually for about 15 to about 60 minutes. After the reaction period, the bis-(alkylsulfonyl)pentachloroquinoline compound can be obtained by washing the reaction mixture with cold water and thereafter recovering the crystalline product by conventional methods such as filtration, centrifugation or the like.

The following examples are intended to illustrate the invention described herein without unduly restricting it.

Example 1.—3,5,6,7,8-Pentachloro-2,4-bis-(methylthio)-quinoline 2.3 Grams (0.10 mole) of sodium metal was dissolved in 100 milliliters of isopropyl alcohol and the solution stirred and cooled. Methanethiol was added in small portions until all the sodium was dissolved. The prepared sodium methyl mercaptide solution was transferred to a dropping funnel and added dropwise, with agitation, to a solution of heptachloroquinoline (18.5 grams; 0.05 mole) in isopropanol. During the mercaptide addition, the temperature of reaction mixture was maintained below about 20° C. by external cooling means. Additional portions of isopropanol were also added to the reaction mixture during the course of the mercaptide addition to prevent the mixture from becoming too thick. After the addition of the mercaptide solution was complete, the reaction mixture was maintained at ambient temperatures for a period of about 16 hours. Following the reaction period, the reaction mixture was filtered and the solids obtained were washed with small amounts of isopropanol and then dissolved in hot chloroform. The resulting solution was filtered and cooled and the solid 3,5,6,7,8-pentachloro-2,4-bis(methylthio)quinoline product was separated by filtration and recrystallized from chloroform. The product thus obtained has a melting point of 148.5–149° C. Analysis.— Calculated for $C_{11}H_6Cl_5NS_2$ (molecular weight 393.58) (percent): C, 33.57; H, 1.54; Cl, 45.04; N, 3.56; S, 16.29. Found (percent): C, 33.47; H, 1.67; Cl, 45.14; N, 3.81; S, 16.15.

In accordance with the procedures and reactants employed in Example 1 above, the replacement of methanethiol with:

1-propanethiol,
2-propanethiol,
1-butanethiol,
1-hexanethiol,
cyclooctanethiol,
1-octanethiol,
1-decanethiol,
benzenethiol, and
cyclohexanethiol, yields the following compounds of the present invention:

3,5,6,7,8 - pentachloro-2,4-bis(propylthio)quinoline (melting at 71.5–73° C.);
3,5,6,7,8-pentachloro - 2,4 - bis(isopropylthio)quinoline (melting at 119–120° C.);
3,5,6,7,8-pentachloro - 2,4 - bis(butylthio)quinoline (melting at 43–44° C.);
3,5,6,7,8-pentachloro - 2,4 - bis(hexylthio)quinoline (molecular weight 533.59);
3,5,6,7,8-pentachloro - 2,4 - bis(cyclooctylthio)quinoline (molecular weight 585.63);
3,5,6,7,8-pentachloro - 2,4 - bis(octylthio)quinoline (melting at 44–45° C.);
3,5,6,7,8-pentachloro - 2,4 - bis(decylthio)quinoline (molecular weight of 645.67);
3,5,6,7,8 - pentachloro - 2,4 - bis(phenylthio)quinoline (melting at 146–147° C.); and
3,5,6,7,8-pentachloro - 2,4 - bis(cyclohexylthio)quinoline (melting at 152–153° C.).

Example 2.—3,5,6,7,8-pentachloro-2,4-bis(methylsulfonyl)quinoline 11.83 Grams (0.03 mole) of 3,5,6,7,8-pentachloro-2,4-bis(methylthio)quinoline was mixed with about 150 milliliters (mls.) of acetic acid and the resulting mixture was to about 50° C. An oxidation mixture of 30 mls. of acetic anhydride, 30 mls. of acetic anhydride and 3.26 mls. of 90% hydrogen peroxide was added to the quinoline-acetic acid mixture by dropwise addition, with agitation, over a period of about one hour and 25 minutes. The reaction mixture warmed slightly to about 51° C. about 35 minutes after the addition of the oxidation mixture commenced and sufficient ice water was added to the reaction mixture to cool it to about 46° C. Following the completion of the oxidation mixture addition (the reaction mixture temperature was about 50° C.), the reaction mixture was poured into about 1200 mls. of ice water. The resulting precipitate was recovered by filtration and subsequently dissolved in about 300 mls. of dichloromethane. The solution was then filtered and concentrated. Upon dilution of the concentrated mixture with n-hexane, a crystalline precipitate formed and was recovered by filtration and dried. As a result of these operations, the desired 3,5,6,7,8-pentachloro-2,4-bis(methylsulfonyl)quinoline compound was recovered as a yellow crystalline material having a melting point of 242–243° C. (95% purity).

In accordance with the procedures and materials employed in Example 2 above, the replacement of 3,5,6,7,8-pentachloro-2,4-bis(methylthio)quinoline with one of the alkylthio compounds listed following Example 1 yields the following corresponding compounds:

3,5,6,7,8-pentachloro-2,4-bis(propylsulfonyl)quinoline (melting at 169–170° C.);
3,5,6,7,8-pentachloro-2,4-bis(isopropylsulfonyl)quinoline (melting at 133–138° C.);
3,5,6,7,8-pentachloro-2,4-bis(butylsulfonyl)quinoline (melting at 155–156° C.);
3,5,6,7,8-pentachloro-2,4-bis(hexylsulfonyl)quinoline (molecular weight 597.59);
3,5,6,7,8-pentachloro-2,4-bis(cyclooctylsulfonyl)quinoline (molecular weight 649.63);
3,5,6,7,8-pentachloro-2,4-bis(octylsulfonyl)quinoline melting at 144–145° C.);
3,5,6,7,8-pentachloro-2,4-bis(decylsulfonyl)quinoline (molecular weight 709.67);
3,5,6,7,8-pentachloro-2,4-bis(phenylsulfonyl)quinoline (melting at 115–120° C.); and
3,5,6,7,8-pentachloro-2,4-bis(cyclohexylsulfonyl)quinoline (melting at 167–169° C.).

The foregoing compounds are suitable for use in fungicidal applications in the form obtained from the reaction mixture; however, the compounds may be further purified by recrystallization or other conventional techniques to obtain the highly purified compound for selective uses if desired.

The heptachloroquinoline, alkylmercaptan and cycloalkylmercaptan reactants are known materials which are either readily available or which can be preparred according to known or analogous procedures set forth in the art.

The compounds of the present invention wherein $n$ is 1 are useful as fungicides in a variety of applications. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

It is to be understood, however, that all of the compounds claimed and compositions containing them may not be equally effective at similar concentrations or against the same fungal organisms. The exact concentration of the toxic substituent to be employed in the treating compositions is not critical and may vary considerably provided the fungal organisms and/or their respective habitats are contacted with an effective amount of the toxicant. The concentration of the toxicants in liquid compositions generally is from about 1.0 to about 50 percent by weight, although concentrations of up to about 95 weight percent are often employed. In dusts or dry formulations, the concentration of the toxicant can be from about 1.0 to about 10 weight percent; however, concentrations up to about 95 weight percent are often conveniently employed. In compositions to be employed as concentrates, the toxicant can be present in a concentration of from about 5 to about 98 weight percent.

The compounds of this invention also can be applied admixed with other chemicals which are used in agronomic and horticultural management and are compatible with the compounds of this invention. Such chemicals can be, but are not restricted to, the classes of chemicals commonly known as plant nutrients, fertilizers, insecticides, other fungicides, herbicides, and nematocides.

Each of the compounds of the present invention, the utility of which is not specifically recited hereinafter, has the ability to inhibit or otherwise control one or more fungal pests when applied at dosage levels of from about 100 to about 5,000 or more parts per million by weight.

In representative operations, each of the 3,5,6,7,8-pentachloro - 2,4 - bis(methylsulfonyl)quinoline; 3,5,6,7,8-pentachloro - 2,4 - bis(propylsulfonyl)quinoline; 3,5,6,7,8 - pentachloro-2,4-bis(phenylsulfonyl) quinoline; and 3,5,6,7,8 - pentachloro-2,4-bis(cyclohexylsulfonyl)quinoline compounds inhibits or gives substantially complete control of *Staphylococcus aureus* when such organisms are contacted with compositions containing one of the above-named compounds at a concentration of 100 parts per million by weight.

In other representative operations, each of the 3,5,6,7,8 - pentachloro - 2,4 - bis(isopropylsulfonyl)quinoline; 3,5,6,7,8 - pentachloro-2,4-bis(cyclohexylsulfonyl)quinoline; and 3,5,6,7,8 - pentachloro-2,4-bis(phenylsulfonyl) quinoline compounds inhibits or gives substantially complete control of *Mycobacterium phlei* when such organisms are contacted with the compositions containing one of the above-named compounds at a concentration of 500 parts per million by weight.

In additional operations, the 3,5,6,7,8-pentachloro-2,4-bis(butylsulfonyl)quinoline compound gives substantially complete control of *Straphylococcus aureus, Trichophyton mentagrophytes, Bacillus subtilis,* and *Mycobacterium phlei* when such organisms are contacted with a composition containing the compound at a concentration of 500 parts per million by weight.

In other operations, each of the 3,5,6,7,8-pentachloro-2,4 - bis(methylsulfonyl)quinoline and 3,5,6,7,8 - pentachloro-2,4-bis(propylsulfonyl)quinoline compounds gives substantially complete control of *Trichophyton mentagrophytes* and *Bacillus subtitis* when such orgnasims are contacted with compositions containing one of the named compounds at a concentration of 100 parts per million by weight. Each of the above-named compounds also gives substantially complete control of downey mildew when such fungal growth is contacted with compositions containing one of the compounds at a concentration of 4000 parts per million by weight.

In an additional representative operation, compositions containing the 3,5,6,7,8 - pentachloro - 2,4 - bis(octylsulfonyl)quinoline compound at a concentration of 4000 parts per million by weight were found to give substantially complete control of bean mildew.

While this invention has been described and exemplified in terms of its preferred embodiment, those skilled in the art will appreciate that modifications can be made without departing from the spirit and scope of the invenion.

What is claimed is:
1. A compound corresponding to the formula:

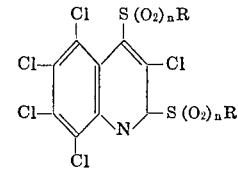

wherein n is 0 or 1; and
each R represents alkyl of from 1 to 10 carbon atoms, phenyl or cycloalkyl of from 5 to 8 carbon atoms.

2. A compound of Claim 1 wherein $n$ is 0.
3. A compound of Claim 1 wherein $n$ is 1.
4. A compound of Claim 1 wherein $n$ is 0 and each R represents alkyl of from 1 to 10 carbon atoms.
5. A compound of Claim 1 wherein $n$ is 1 and each R represents alkyl of from 1 to 10 carbon atoms.
6. The compound of Claim 2 in which 3,5,6,7,8-pentachloro-2,4-bis(methylthio)quinoline.
7. The compound of Claim 2 which is 3,5,6,7,8-pentachloro-2,4-bis(propylthio)quinoline.
8. The compound of Claim 2 which is 3,5,6,7,8-pentachloro-2,4-bis(butylthio)quinoline.
9. The compound of Claim 2 which is 3,5,6,7,8-pentachloro-2,4-bis(octylthio)quinoline.
10. The compound of Claim 2 which is 3,5,6,7,8-pentachloro-2,4-bis(isopropylthio)quinoline.
11. The compound of Claim 2 which is 3,5,6,7,8-pentachloro-2,4-bis(cyclohexylthio)quinoline.
12. The compound of Claim 2 which is 3,5,6,7,8-pentachloro-2,4-bis(phenylthio)quinoline.
13. The compound of Claim 3 which is 3,5,6,7,8-pentachloro-2,4-bis(methylsulfonyl)quinoline.
14. The compound of Claim 3 which is 3,5,6,7,8-pentachloro-2,4-bis(propylsulfonyl)quinoline.
15. The compound of Claim 3 which is 3,5,6,7,8-pentachloro-2,4-bis(butylsulfonyl)quinoline.
16. The compound of Claim 3 which is 3,5,6,7,8-pentachloro-2,4-bis(octylsulfonyl)quinoline.
17. The compound of Claim 3 which is 3,5,6,7,8-pentachloro-2,4-bis(isopropylsulfonyl)quinoline.
18. The compound of Claim 3 which is 3,5,6,7,8-pentachloro-2,4-bis(cyclohexylsulfonyl)quinoline.
19. The compound of Claim 3 which is 3,5,6,7,8-pentachloro-2,4-bis(phenylsulfonyl)quinoline.

No references cited.

DONALD G. DAUS, Primary Examiner

M. C. VAUGHN, Assistant Examiner

U.S. Cl. X.R.

71—94; 260—283 R; 424—258